United States Patent
Fischer et al.

(10) Patent No.: US 6,789,061 B1
(45) Date of Patent: Sep. 7, 2004

(54) METHOD AND SYSTEM FOR GENERATING SQUEEZED ACOUSTIC MODELS FOR SPECIALIZED SPEECH RECOGNIZER

(75) Inventors: Volker Fischer, Leimen (DE); Siegfried Kunzmann, Heidelberg (DE); Claire Waast-Ricard, Vélizy-Villacoublay (FR)

(73) Assignee: International Business Machines Corporation, Armonk, NY (US)

(*) Notice: Subject to any disclaimer, the term of this patent is extended or adjusted under 35 U.S.C. 154(b) by 170 days.

(21) Appl. No.: 09/638,160

(22) Filed: Aug. 14, 2000

(30) Foreign Application Priority Data

Aug. 25, 1999 (EP) .............................................. 99116684

(51) Int. Cl.⁷ .............................................. G10L 15/08
(52) U.S. Cl. ...................... 704/240; 704/235; 704/256; 704/231; 704/251
(58) Field of Search ................................ 704/240, 231, 704/247, 251, 255, 256

(56) References Cited

U.S. PATENT DOCUMENTS

| | | | | |
|---|---|---|---|---|
| 5,384,892 A | * | 1/1995 | Strong | 704/243 |
| 5,719,996 A | * | 2/1998 | Chang et al. | 704/256 |
| 5,758,319 A | * | 5/1998 | Knittle | 704/251 |
| 6,070,140 A | * | 5/2000 | Tran | 704/232 |
| 6,122,613 A | * | 9/2000 | Baker | 704/235 |
| 6,260,013 B1 | * | 7/2001 | Sejnoha | 704/240 |
| 6,260,014 B1 | * | 7/2001 | Bahl et al. | 704/231 |
| 6,463,413 B1 | * | 10/2002 | Applebaum et al. | 704/256 |

* cited by examiner

*Primary Examiner*—Richemond Dorvil
*Assistant Examiner*—Qi Han
(74) *Attorney, Agent, or Firm*—Thu Ann Dang; Ryan, Mason & Lewis, LLP

(57) ABSTRACT

Computer-based methods and systems are provided for automatically generating, from a first speech recognizer, a second speech recognizer such that the second speech recognizer is tailored to a certain application and requires reduced resources compared to the first speech recognizer. The invention exploits the first speech recognizer's set of states $s_i$ and set of probability density functions (pdfs) assembling output probabilities for an observation of a speech frame in said states $s_i$. The invention teaches a first step of generating a set of states of the second speech recognizer reduced to a subset of states of the first speech recognizer being distinctive of the certain application. The invention teaches a second step of generating a set of probability density functions of the second speech recognizer reduced to a subset of probability density functions of the first speech recognizer being distinctive of the certain application.

23 Claims, 1 Drawing Sheet

METHOD AND SYSTEM FOR GENERATING SQUEEZED ACOUSTIC MODELS FOR SPECIALIZED SPEECH RECOGNIZER

FIELD OF THE INVENTION

The present invention relates to speech recognition systems and, more particularly, to computerized methods and systems for automatically generating, from a first speech recognizer, a second speech recognizer tailored to a certain application.

BACKGROUND OF THE INVENTION

To achieve a good acoustic resolution across different speakers, domains, or applications, a general purpose large vocabulary continuous speech recognizer, for instance, those based on the Hidden Markov Model (HMM), usually employs several thousands of states and several tens of thousands of elementary probability density functions (pdfs), e.g., gaussian mixture components, to model the observation likelihood of a speech frame. While this allows for an accurate representation of the many variations of sounds in naturally spoken human speech, the storage and evaluation of several tens of thousands of multidimensional pdfs during recognition is a computationally expensive task with respect to both computing time and memory footprints.

Both the total number of context dependent states and gaussian mixture components are usually limited by some upper bound to avoid the use of computationally very expensive optimization methods, like, e.g., the use of a Bayesian information criterion.

However, this bears the disadvantage that some acoustic models are poorly trained because of a mismatch between the collected training data and the task domain or due to a lack of training data for certain pronunciations. In contrast, other models may be unnecessarily complex to achieve a good recognition performance and, in any case, the reliable estimation of several millions of parameters needs a large amount of training data and is a very time consuming process. Whereas applications like large vocabulary continuous dictation systems (like, e.g., IBM Corporation's ViaVoice) can rely on today's powerful desktop computers, this is clearly unfeasible in many applications that need to deal with limited hardware resources, like, e.g., in the embedded systems or consumer devices market. However, such applications often need to perform a limited task only, like, e.g., the (speaker dependent) recognition of a few names from a speaker's address book, or the recognition of a few command words.

A state-of-the-art method dealing with the reduction of resources and computing time for large vocabulary continuous speech recognizers is the teaching of Curtis. D. Knittle, "Method and System for Limiting the Number of Words Searched by a Voice Recognition System," U.S. Pat. No. 5,758,319, issued in 1998, the disclosure of which is incorporated by reference herein. But as a severe drawback, these methods achieve a resource reduction only by proposing a runtime limitation of the number of candidate words in the active vocabulary by means of precomputed word sequence probabilities (the speech recognizer's language model). Such an approach seems to be not acceptable as it imposes an undesirable limitation of the recognition scope.

SUMMARY OF THE INVENTION

The present invention is based on the objective to provide a technology for fast and easy customization of a general speech recognizer to a given application. It is a further objective to provide a technology for providing specialized speech recognizers requiring reduced computation resources, for instance, in terms of computing time and memory footprints.

In one aspect of the invention, a computerized method and system is provided for automatically generating, from a first speech recognizer, a second speech recognizer tailored to a certain application and requiring reduced resources compared to the first speech recognizer.

The invention exploits the first speech recognizer's set of states $s_i$ and set of probability density functions (pdfs) assembling output probabilities for an observation of a speech frame in the states $s_i$.

The invention teaches a first step of generating a set of states of the second speech recognizer reduced to a subset of states of the first speech recognizer being distinctive of the certain application.

The invention teaches a second step of generating a set of probability density functions of the second speech recognizer reduced to a subset of probability density functions of the first speech recognizer being distinctive of the certain application.

The teachings of the present invention allow for the rapid development of new data files for recognizers in specific environments and for specific applications. The generated speech recognizers require significantly reduced resources, without decreasing the recognition accuracy or the scope of recognizable words.

The invention allows to achieve a scalable recognition accuracy for the generated application-specific speech recognizer; the generation process can be executed repeatedly until the generated application-specific speech recognizer achieves the required resource targets and accuracy target.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
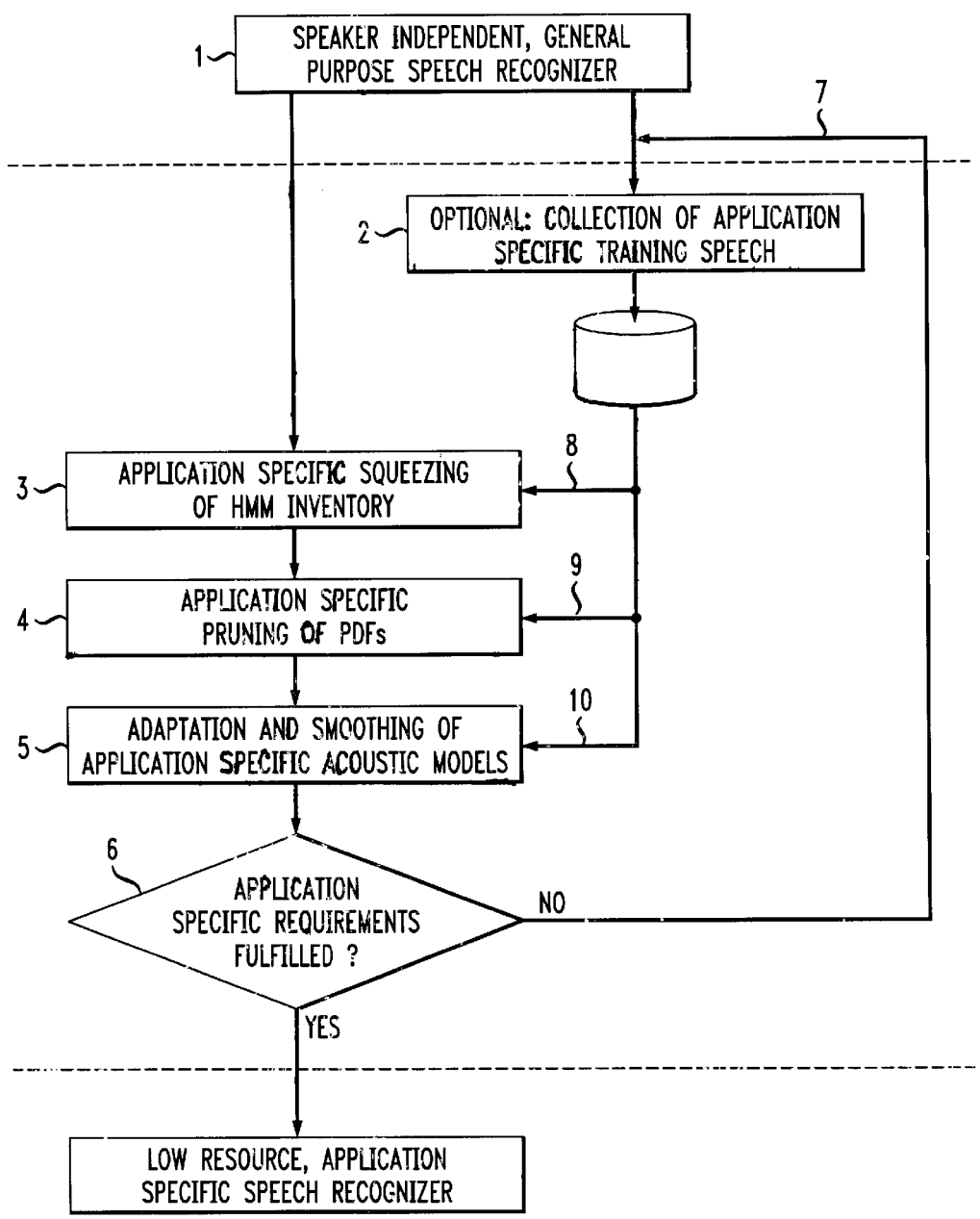
FIG. 1 is a diagram reflecting an overall structure of a methodology according to one embodiment of the present invention for generating a speech recognizer tailored to a certain application and requiring reduced resources.

In the drawings and specification there has been set forth a preferred embodiment of the invention and, although specific terms are used, the description thus given uses terminology in a generic and descriptive sense only and not for purposes of limitation.

The present invention can be realized in hardware, software, or a combination of hardware and software. Any kind of computer system, or other apparatus adapted for carrying out the methods described herein, is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system, is able to carry out these methods.

Computer program means or computer program in the present context mean any expression, in any language, code or notation, of a set of instructions intended to cause a system having an information processing capability (e.g., one or more processors) to perform a particular function either directly or after either or both of the following: (a) conversion to another language, code or notation; (b) reproduction in a different material form.

While the current specification may disclose the invention for speech recognizers exploiting the technology of Hidden Markov Models (HMM), this does not indicate that the present invention cannot be applied to other approaches for speech recognizers.

Introduction

Very often today's speech recognition systems use Hidden Markov Models to compute the likelihood of a word sequence w given a speech signal f.

A Hidden Markov Model is a stochastic automaton $A=(\pi A,B)$ that operates on a finite set of states $S=\{s_1, \ldots, s_N\}$ and allows for the observation of an output each time t, t=1,2, ..., T, a state is occupied. The initial state vector:

$$\pi=[\pi_i]=[P(s(1)=s_i)], 1 \leq i \leq N,$$

gives the probabilities that the HMM is in state $s_i$ at time t=1, and the transition matrix:

$$A=[a_{ij}]=[P(s(t+1)=s_j|s(t)=s_i)], 1 \leq i,j \leq N,$$

holds the probabilities of a first order time invariant process that describes the transitions from $s_i$ state to $s_j$. The observations are continuous valued feature vectors x∈R derived from the incoming speech signal, and the output probabilities are defined by a set of probability density functions:

$$B=[b_i]=[p(x|s(t)=s_i], 1 \leq i \leq N.$$

For any given HMM state $s_i$, the unknown distribution of the feature vectors is approximated by a mixture of (usually gaussian) elementary probability density functions (pdfs). Whereas continuous HMMs provide a state specific set $M_i$ of mixture components to model the probability:

$$p(x|s_i) = \sum_{j \in M_i} (\omega_{ji} \cdot N(x|\mu_{ji}, \Gamma_{ji}))$$

$$= \sum_{j \in M_i} (\omega_{ji} \cdot |2\pi\Gamma_{ji}|^{-1/2} \cdot \exp(-(x-\mu_{ji})_T \Gamma_{ji}^{-1}(x-\mu_{ji})/2));$$

of observing x in state $s_i$, semi-continuous HMMs share a common set M of pdfs, but use state-specific mixture component weights $\omega_{ik}$; thus:

$$p(x|s_i) = \sum_{j \in M} (\omega_{ji} \cdot N(x|\mu_j, \Gamma_j))$$

$$= \sum_{j \in M} (\omega_{ji} \cdot |2\pi\Gamma_j|^{-1/2} \cdot \exp(-(x-\mu_j)_T \Gamma_j^{-1}(x-\mu_j)/2));$$

Here, $\omega_{ji}$ denotes the j-th mixture component weight for the i-th output distribution, $\mu_{ji}$ and $\Gamma_{ji}$ are the mean and covariance matrix of the j-th Gaussian in state $s_i$, and x denotes the observed feature vector.

Since the sounds of naturally spoken, continuous human speech differ largely with respect to different acoustic contexts, the base inventory of HMM based speech recognizers is provided by a set of context dependent subword units, like, e.g., triphones, phones, or sub-phones. In general, each context dependent subword unit is modeled by a HMM with several states, and each HMM state usually employs numerous elementary pdfs to achieve a good acoustic resolution; this overall model is the acoustic model of the speech recognizer. Therefore, today's general purpose speaker independent speech recognizers usually end up with several thousands of HMM states and several tens of thousands of multi-dimensional pdfs whose parameters have to be estimated from a large amount of training data.

A bootstrap procedure for the training of a speech recognizer may be based on the following methodology. The algorithm makes use of a labeled training corpus and a speaker independent recognizer for the computation of an initial alignment between the spoken words and the speech signal. For an identification of significant acoustic contexts, the labeled training data is passed through a binary decision network that separates the phonetic contexts into a predefined number of equivalence classes. Each leaf of the decision network defines a single state, continuous density HMM; the feature vectors at each leaf are described by a gaussian mixture model (as outlined above) that serves as an initial estimate for the HMM's output probability. Subsequently, the state-of-the-art forward-backward algorithm, is used for the refinement of both the gaussian mixture model parameters and the initial estimates of the HMM's transition probabilities.

Solution

The proposed solution according to the present invention to the above-mentioned problems is orthogonal to approaches which exploit speaker adaptation techniques, like, e.g., maximum a posteriori adaptation (MAP), for the generation of specialized speech recognizers in an acoustic toolkit environment. These approaches are being based on the observation that upfront adaptation can be applied to move the acoustic model parameters of a HMM based speech recognizer to an application dependent acoustic space, like, e.g., a certain dialect or domain. Thus, it is clear immediately, that those techniques aim on an improved recognition accuracy but not on a reduction of memory footprints or computation time, and therefore do not reduce the size of the adapted acoustic models.

Moreover, the already-mentioned teaching of Curtis. D. Knittle, U.S. Pat. No. 5,758,319, is orthogonal to the current solution. While Kittle proposes a runtime limitation of the number of candidate words in the active vocabulary by means of precomputed word sequence probabilities (the speech recognizer's language model), the present invention suggests a reduction of the size of the acoustic model, i.e., both the number of acoustic subword unit HMMs, like, e.g. context dependent phone or triphone models, and the number of elementary pdfs for the output probabilities of these HMMs. Thus, most important, the present invention therefore does not limit the size of the vocabulary during the recognition process and, since entirely embedded in the training process, does not require any additional runtime computations.

The architecture of the present invention allows for the fast development of data files for specialized low resource speech recognizers. As its fundamental approach, the present invention addresses the above considerations and problems by squeezing the acoustic models of a general purpose speech recognizer instead of employing a conventional HMM training procedure. It utilizes the cognizance that, for a special task, only a subset of the pdfs from a general purpose speech recognizer provide a significant contribution to the observation likelihood of a HMM state. By identifying those pdfs, either with or without a small amount of additional training material, and the use of a variable deletion threshold, this allows for a scalable recognition accuracy with respect to different target hardware and reduces both memory footprints and computing time.

The basic idea of the invention is depicted in FIG. 1, reflecting an overall structure of a proposed methodology according to one embodiment of the present invention for generating a speech recognizer which is tailored to a certain application and which requires reduced resources.

Referring to FIG. 1, for the rapid development of new data files, it is proposed to squeeze the acoustic models of a general purpose HMM based speech recognizer, (1) in FIG. 1, so to fit to the constraints of the limited hardware resources available for a special application.

Let $Q_{gen}=q_1,q_2,\ldots,q_N$ denote the set of HMM states and $M_{gen}$ the set of elementary pdfs of the general purpose speech recognizer (1). In order to achieve the most accurate recognition results for a given application, it is necessary to identify that subset of HMM states, $Q_{appl}$, (3) in FIG. 1, and the associated set $M_{appl}$ of elementary pdfs, (4) in FIG. 1, that are characteristic for that application.

More formally, the squeezing of acoustic models is achieved by the definition of two application-specific functions:

$$\chi_Q : Q_{gen} \mapsto \{0,1\},$$

$$\chi_M : M_{gen} \mapsto \{0,1\},$$

on the sets $Q_{gen}$ and $M_{gen}$. The present invention then uses:

$$Q_{appl} = \{q_i \in Q_{gen} | \chi_Q(q_i)=1\}$$

as the set of application-specific HMM states, and the application-specific set of elementary pdfs by:

$$M_{appl} = \{p_j \in M_{gen} | \chi_M(p_j)=1\},$$

where $p_j=(\omega_j,\mu_j,\Gamma_j)$ is the j-th mixture component of the general purpose speech recognizer. Consequently, squeezing the general purpose acoustic models means to remove those elements that are neither member of $Q_{appl}$ nor $M_{appl}$.

Thus, the introduction of a set $Q_{appl}$ corresponds to an approach (3) in FIG. 1 of generating, from the set of states of the general purpose speech recognizer, a set of states of the application-specific speech recognizer by selecting a subset of states of the general purpose speech recognizer which are distinctive of the specific application.

Whereas the introduction of a set $M_{appl}$ corresponds to an approach (4) in FIG. 1 of generating, from the set of probability density functions of the general purpose speech recognizer, a set of probability density functions of the application-specific speech recognizer by selecting a subset of probability density functions of the general purpose speech recognizer being distinctive of the specific application. While in the above step of excluding certain states of the general purpose speech recognizer for the application-specific speech recognizer also certain pdfs are excluded, namely all those pdfs which involve excluded states, the current step of excluding certain pdfs is not effecting the selected states.

Both of above-mentioned steps (selecting a subset of states $Q_{appl}$ and selecting a subset of pdfs $M_{appl}$) may be exploited separately or in combination.

The design and definition of both $\chi_Q$ and $\chi_M$ is based on the fundamental approach to select those states of the general purpose speech recognizer which are distinctive of the specific application. Two approaches are suggested:

1. an approach which makes use of knowledge about the target application (e.g., phonetical knowledge);
2. a data driven approach that requires the collection of a small amount of application-specific training data, (2) in FIG. 1.

Both of these approaches may be used together in any possible combination and are illustrated in an example application in the next section.

A possible approach for defining a subset of states via $\chi_Q$ is based on the observation that a small amount of application-specific speech data allows to further identify the relevant phonetic contexts of the application. For that purpose, usage of the technique of viterbi-aligning the speech data against its transcription to tag each speech frame with its correct leaf id $q_i$ (see above) is suggested in accordance with (2), (8) in FIG. 1. Then, the following characteristic function could be used:

$$\chi_Q(q_i) = \begin{cases} 1 & \text{iff } \#(q_i)/\sum_j \#(q_j) > \theta_1 \\ 0 & \text{else} \end{cases}$$

where $\#(q_i)$ is the number of speech frames tagged with leaf id $q_i$ and $\theta_1$ is a threshold that suits the needs of the special application. Again, in order to build the application specific recognizer, the HMM state corresponding to a leaf is removed from the general purpose recognizer if $\chi_Q=0$. Stated in other words: those states of the general purpose speech recognizer occurring within the training data with a frequency above a certain threshold are selected for the application specific speech recognizer.

Next, possible approaches for defining a subset of pdfs via $\chi_M$ are discussed.

A further reduction of the acoustic model size is achieved by the pruning of elementary pdfs from the remaining HMM states, (4) in FIG. 1. The identification of pdfs, which can be eliminated from a HMM state's output distribution without a dramatic decrease of recognition accuracy, can be based on applying a threshold on the mixture component weights in a HMM state. For the example of the pruning of Gaussians in a HMM based speech recognizer, the following approach can be used:

$$\chi_M(p_j) = \begin{cases} 1 & \text{iff } w_j > \theta_2 \\ 0 & \text{else} \end{cases}$$

where $\theta_2$ is a state dependent or fixed threshold.

Another approach could apply a state dependent or fixed threshold to the sorted and accumulated mixture component weights or to the output probabilities; only those pdfs passing that threshold would be selected for the specific application speech recognizer.

Whereas these methods treat each HMM state uniformly, a rank based quality measure may be exploited to identify those HMM states that can be modeled by a smaller number of elementary pdfs in a given application. The approach eventually comprises two steps:

1. identifying, from the set of states of the general speech recognizer, a set of candidate states, for which the pdfs contributing to the output probability in that candidates states, safely can be pruned (reduced). The specific approach of the present invention is to use the more reliably classifiable states as these candidate states.

2. using anyone of the pruning techniques to prune (reduce) the pdfs of the candidate states.

Different from the former approaches, this requires the collection of a small amount of application-specific training data, (2) in FIG. 1. Again, test data is viterbi-aligned against the transcription to tag each speech frame with the correct leaf id $q_i$, (9) in FIG. 1. Then, the output probability for each HMM is computed, the probabilities are sorted in decreasing order, and the rank of the correct leaf is observed. For each leaf (i.e., state), then the following probability (representing a measure whether a state is more or less reliably classifiable) is computed:

$$P_i = \frac{\#(r_i)}{\#(q_i)};$$

here $\#(q_i)$ is the number of observations for the i-th leaf (with respect to the alignment of the correct states to the training data), and:

$$\#(r_i) = \#(\text{rank}(q_i)) \leq \theta_4$$

gives the number of frames where the i-th leaf is correct and has a rank less than a given threshold $\theta_4$. Consequently, a high value for $P_i$ (e.g. $P_i > 0.8$, for instance) implies that the i-th leaf is rarely misclassified, and the number of pdfs can be reduced; as a method for reducing pdfs, the approach discussed above could be used, for instance (only pdfs with a weight above a certain threshold would contribute). Vice versa, pdfs contributing to states with a low value for $P_i$ will not be pruned. An example of a reduced Gaussian speech recognizer is also given in the next section.

Since the pruning of Gaussians always causes a coarser approximation of the feature space for a class (or leaf) $q_i$, the re-estimation and smoothing of the remaining mixture model components, (5) in FIG. 1, is an additional optional step that usually increases the recognition accuracy. For that purpose, the invention relies on standard algorithms like, e.g., forward-backward training and maximum a posteriori adaptation. Application-specific training speech may also be used, (10) in FIG. 1.

An important aspect of this invention is the reduced effort for the generation of a specific speech recognizer: whereas other commercially available tool kits start from the definition of subword units and/or HMM topologies, and thus require a considerable large amount of training data, the proposed approach starts from an already trained general purpose speech recognizer. Thus, the invention allows for the easy and flexible customization to any given application and any resource.

Application

The purpose of this invention is to provide a technique for the fast and easy development of new data files for speech recognition applications that have to deal with low resource hardware. It is therefore not restricted to any specific application; the examples in this section are given to illustrate the feasibility of this approach.

In a first example, see Table 1 below, the squeezing of a general purpose speech recognizer to a spoken digit recognition system (like, e.g., a voice dialing application) is illustrated. The phone set of the IBM's ViaVoice large vocabulary continuous speech recognition system (the general purpose recognizer) comprises 62 phones for a general 400,000 word vocabulary of the German language, but only 23 phones are sufficient to build the pronunciations for an eleven word digit vocabulary. Thus, the spoken digit recognizer can be derived immediately from the general purpose recognizer using the teachings of the present invention by removing all HMMs that are used to model the remaining 39 phones in their different contexts.

Table 1 compares the results for a 1500 word connected digit recognition task, where the incoming test data is bandlimited to 8 kHz. The first column compares the percent real time for the evaluation of the Gaussians (RT) for the general purpose recognizer ("gen," the IBM ViaVoice large vocabulary continuous speech recognition system) and the squeezed recognizer ("dig"), the second column shows a 7 percent relative improvement for the word error rate (WER) of the squeezed recognizer, and the third column shows a 30 percent decrease in the size of the data files (bytes) created by the current method.

TABLE 1

|  | % RT | % WER | Size |
|---|---|---|---|
| gen | 1.00 | 1.00 | 1.00 |
| dig | 0.97 | 0.93 | 0.70 |

Whereas the above example (Table 1) demonstrates the feasibility of HMM state removal, Table 2 shows the effects of pruning of elementary pdfs and the scalability of recognition accuracy with respect to varying resources.

TABLE 2

|  | % RT | % WER | Size |
|---|---|---|---|
| General | 1.00 | 1.00 | 1.00 |
| Dialect | 0.97 | 0.88 | .00 |
| θ = 0.25 | 0.96 | 0.87 | 0.81 |
| θ = 0.50 | 0.95 | 0.90 | 0.72 |
| θ = 0.75 | 0.89 | 0.95 | 0.59 |
| θ = 1.00 | 0.81 | 1.02 | 0.50 |

Here, a small amount of speech data from Austrian speakers has been collected and then state-of-the-art methods to create a dialect speech recognizer from a large vocabulary continuous speech recognition system for general German has been exploited. Subsequently, the dialect acoustic model was squeezed according to:

$$\chi_M(p_j) = \begin{cases} 1 & \text{iff } w_j^d > \theta \cdot \omega_j^g \\ 0 & \text{else} \end{cases}$$

where $p_j$ is the j-th Gaussian under consideration, $\theta$ is an application-specific threshold, $0 < \theta <= 1$, and $W_j^d$ and $\omega_j^g$ denote the j-th mixture component weight of the dialect acoustic and the general acoustic model, respectively. Table 2 compares the average word error rates for recognition experiments with a 65,000 word vocabulary, and also reports the time for the evaluation of the Gaussians and the size of the data files. It becomes evident that on the hand the current technology allows to reduce the size of the specialized speech recognizer by 50 percent nearly without affecting the recognition accuracy ($\theta=1.00$), and that it allows also for a slightly improved accuracy, if a less rigid squeezing ($\theta=0.25$) is employed.

Advantages

As presented in the previous sections, the suggested teachings of the invention offer the advantage of reducing the time for the training of the recognizer, and therefore allow for the rapid development of new data files for recognizers in specific environments and for specific applications.

Most fundamental, the generated speech recognizer tailored to a certain application requires significantly reduced resources compared to the general purpose speech recognizer which formed the base for the generation process. A great decrease in the size of the data files for the specialized speech recognizers is achieved. Moreover, due to the significantly smaller speech models, the computational complexity also has been reduced allowing either for a faster processing at run time or for minor hardware prerequisites. As shown above, it was even possible to increase the recognition accuracy for non-rigid smoothing in the area of the specific application. Also important is that the present teachings do not require to limit the scope of recognizable words to accomplish the goal of reduced resources. Of course, it would be possible to use the present invention to first reduce the required resources in the specific application area and then to "invest" these resources again to increase the recognition accuracy above the level of the general purpose speech recognizer.

The invention offers a scalable recognition accuracy that allows a fast and easy customization to any available resource target; the generation process can be executed repeatedly, (7) in FIG. 1, until the generated application-specific speech recognizer achieves the required resource targets and accuracy target, (6) in FIG. 1.

Finally, the tailoring process can be controlled by few additional domain specific or dialect data specific data, which is inexpensive and easy to collect.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-based method of automatically generating, from a first speech recognizer, a second speech recognizer, wherein the first speech recognizer includes a set of states and a set of probability density functions assembling output probabilities for an observation of a speech frame in the states, the method comprising the steps of:
    generating, from the set of states of the first speech recognizer, a set of states of the second speech recognizer by selecting a subset of states of the first speech recognizer being distinctive of a particular application; and
    generating, from the set of probability density functions of the first speech recognizer, a set of probability density functions of the second speech recognizer by selecting a subset of probability density functions of the first speech recognizer being distinctive of the particular application, such that the second speech recognizer is at least one of tailored to the particular application and requires reduced resources compared to the first speech recognizer.

2. The method of claim 1, further comprising the step of generating acoustic model parameters of the second speech recognizer by reestimating acoustic model parameters of the first speech recognizer based on the set of states of the second speech recognizer and the set of probability density functions of the second speech recognizer.

3. The method of claim 2, further comprising the steps of:
    determining at least one of resource requirements and recognition accuracy of the second speech recognizer; and
    repeating the state set generation, probability density function set generation, and acoustic model parameter generation steps, with one of more limiting and less limiting selection criteria, when at least one of the resource requirements and the recognition accuracy does not achieve at least one of a resource target and an accuracy target, respectively.

4. The method of claim 2, wherein selecting at least one of the subset of states and the subset of probability density functions of the first speech recognizer exploits phonetical knowledge of the particular application.

5. The method of claim 4, wherein selecting at least one of the subset of states and the subset of probability density functions of the first speech recognizer exploits application-specific training data.

6. The method of claim 5, wherein selecting the subset of states comprises associating a multitude of speech frames of the training data with the correct states of the first speech recognizer and selecting those states with a frequency of occurrence above a threshold as the subset of states.

7. The method of claim 5, wherein the set of probability density functions of the first speech recognizer assemble output probabilities as a weighted sum, and wherein selecting the subset of probability density functions comprises selecting those probability density functions contributing to the output probabilities with a weight above a threshold.

8. The method of claim 4, wherein selecting the subset of probability density functions comprises the steps of:
    identifying, from the set of states of the first speech recognizer, a subset of more reliably classifiable states; and
    selecting, from an output probability of a more reliably classifiable state, those probability density functions contributing to the output probability with a weight above a threshold.

9. The method of claim 8, wherein identifying a more reliably classifiable state comprises the steps of:
    associating a multitude of speech frames of the training data with the correct states of the first speech recognizer; and
    determining, for a certain state, a reliability value as the quotient of: (i) the number of the speech frames for which the certain state is a correct state and for which an output probability for observation of a speech frame in the certain state is among the N highest output probabilities for observation of the speech frame in anyone of the states; and (ii) the number of the speech frames for which the certain state is a correct state; and
    identifying the certain state as a more reliably classifiable state, when the reliability value is above a threshold.

10. Apparatus for automatically generating, from a first speech recognizer, a second speech recognizer, wherein the first speech recognizer includes a set of states and a set of probability density functions assembling output probabilities for an observation of a speech frame in the states, the apparatus comprising:
    at least one processor operative to: (i) generate, from the set of states of the first speech recognizer, a set of states of the second speech recognizer by selecting a subset of states of the first speech recognizer being distinctive of a particular application; and (ii) generate, from the set of probability density functions of the first speech recognizer, a set of probability density functions of the second speech recognizer by selecting a subset of probability density functions of the first speech recognizer being distinctive of the particular application, such that the second speech recognizer is at least one of tailored to the particular application and requires reduced resources compared to the first speech recognizer.

11. The apparatus of claim 10, wherein the at least one processor is further operative to generate acoustic model parameters of the second speech recognizer by reestimating acoustic model parameters of the first speech recognizer based on the set of states of the second speech recognizer and the set of probability density functions of the second speech recognizer.

12. The apparatus of claim 11, wherein the at least one processor is further operative to: (i) determine at least one of resource requirements and recognition accuracy of the second speech recognizer; and (ii) repeat the state set generation, probability density function set generation, and acoustic model parameter generation operations, with one of more limiting and less limiting selection criteria, when at least one of the resource requirements and the recognition accuracy does not achieve at least one of a resource target and an accuracy target, respectively.

13. The apparatus of claim 11, wherein the operation of selecting at least one of the subset of states and the subset of probability density functions of the first speech recognizer exploits phonetical knowledge of the particular application.

14. The apparatus of claim 13, wherein the operation of selecting at least one of the subset of states and the subset of probability density functions of the first speech recognizer exploits application-specific training data.

15. The apparatus of claim 14, wherein the operation of selecting the subset of states comprises associating a multitude of speech frames of the training data with the correct states of the first speech recognizer and selecting those states with a frequency of occurrence above a threshold as the subset of states.

16. The apparatus of claim 14, wherein the set of probability density functions of the first speech recognizer assemble output probabilities as a weighted sum, and wherein selecting the subset of probability density functions comprises selecting those probability density functions contributing to the output probabilities with a weight above a threshold.

17. The apparatus of claim 13, wherein the operation of selecting the subset of probability density functions comprises: (i) identifying, from the set of states of the first speech recognizer, a subset of more reliably classifiable states; and (ii) selecting, from an output probability of a more reliably classifiable state, those probability density functions contributing to the output probability with a weight above a threshold.

18. The apparatus of claim 17, wherein the operation of identifying a more reliably classifiable state comprises: (i) associating a multitude of speech frames of the training data with the correct states of the first speech recognizer; and (ii) determining, for a certain state, a reliability value as the quotient of: (a) the number of the speech frames for which the certain state is a correct state and for which an output probability for observation of a speech frame in the certain state is among the N highest output probabilities for observation of the speech frame in anyone of the states; and (b) the number of the speech frames for which the certain state is a correct state; and (iii) identifying the certain state as a more reliably classifiable state, when the reliability value is above a threshold.

19. An article of manufacture for automatically generating, from a first speech recognizer, a second speech recognizer, wherein the first speech recognizer includes a set of states and a set of probability density functions assembling output probabilities for an observation of a speech frame in the states, comprising a machine readable medium containing one or more programs which when executed implement the steps of:

generating, from the set of states of the first speech recognizer, a set of states of the second speech recognizer by selecting a subset of states of the first speech recognizer being distinctive of a particular application; and generating, from the set of probability density functions of the first speech recognizer, a set of probability density functions of the second speech recognizer by selecting a subset of probability density functions of the first speech recognizer being distinctive of the particular application, such that the second speech recognizer is at least one of tailored to the particular application and requires reduced resources compared to the first speech recognizer.

20. The article of claim 19, further implementing the step of generating acoustic model parameters of the second speech recognizer by reestimating acoustic model parameters of the first speech recognizer based on the set of states of the second speech recognizer and the set of probability density functions of the second speech recognizer.

21. A computer-based method of automatically generating from a first speech recognizer, a second speech recognizer, wherein the first speech recognizer includes a set of states and a set of probability density functions assembling output probabilities for an observation of a speech frame in the states, the method comprising the steps of:

generating, from the set of states of the first speech recognizer, a set of states of the second speech recognizer by selecting a subset of states of the first speech recognizer being distinctive of a particular application; and generating, from the set of probability density functions of the first speech recognizer, a set of probability density functions of the second speech recognizer by selecting a subset of probability density functions of the first speech recognizer being distinctive of the particular application, such that the second speech recognizer is at least one of tailored to the particular application and requires reduced resources compared to the first speech recognizer;

wherein selecting the subset of probability density functions comprises the steps of:
identifying a more reliably classifiable state by associating a multitude of speech frames of application-specific training data with correct states of the first speech recognizer;
determining, for a certain state, a reliability value representing a reliability measurement for the certain state; and
identifying the certain state as a more reliably classifiable state when the reliability value is above a threshold.

22. Apparatus for automatically generating, from a first speech recognizer, a second speech recognizer, wherein the first speech recognizer includes a set of states and a set of probability density functions assembling output probabilities for an observation of a speech frame in the states, the apparatus comprising:

at least one processor operative to: (i) generate, from the set of states of the first speech recognizer, a set of states of the second speech recognizer by selecting a subset of states of the first speech recognizer being distinctive of a particular application; and (ii) generate, from the set of probability density functions of the first speech recognizer, a set of probability density functions of the second speech recognizer by selecting a subset of probability density functions of the first speech recognizer being distinctive of the particular application, such that the second speech recognizer is at least one of tailored to the particular application and requires reduced resources compared to the first speech recognizer;

wherein the operation of selecting the subset of probability density functions comprises: (i) identifying a more reliably classifiable state by associating a multitude of speech frames of application-specific training data with correct states of the first speech recognizer; (ii) determining, for a certain state, a reliability value representing a reliability measurement for the certain state; and (iii) identifying the certain state as a more reliably classifiable state when the reliability value is above a threshold.

23. An article of manufacture for automatically generating, from a first speech recognizer, a second speech recognizer, wherein the first speech recognizer includes a set of states and a set of probability density functions assembling output probabilities for an observation of a speech frame in the states, comprising a machine readable medium containing one or more programs which when executed implement the steps of:

generating, from the set of states of the first speech recognizer, a set of states of the second speech recognizer by selecting a subset of states of the first speech recognizer being distinctive of a particular application; and generating, from the set of probability density functions of the first speech recognizer, a set of probability density functions of the second speech recognizer by selecting a subset of probability density functions of the first speech recognizer being distinctive of the particular application, such that the second speech recognizer is at least one of tailored to the particular application and requires reduced resources compared to the first speech recognizer;

wherein selecting the subset of probability density functions comprises the steps of:

identifying a more reliably classifiable state by associating a multitude of speech frames of application-specific training data with correct states of the first speech recognizer;

determining, for a certain state, a reliability value representing a reliability measurement for the certain state; and identifying the certain state as a more reliably classifiable state when the reliability value is above a threshold.

* * * * *

UNITED STATES PATENT AND TRADEMARK OFFICE
CERTIFICATE OF CORRECTION

PATENT NO. : 6,789,061 B1
DATED : September 7, 2004
INVENTOR(S) : Volker Fischer et al.

It is certified that error appears in the above-identified patent and that said Letters Patent is hereby corrected as shown below:

Column 8,
Line 15, in the Detailed Description of the Preferred Embodiments:
replace

TABLE 2

|  | % RT | % WER | Size |
|---|---|---|---|
| General | 1.00 | 1.00 | 1.00 |
| Dialect | 0.97 | 0.88 | .00 |
| $\theta = 0.25$ | 0.96 | 0.87 | 0.81 |
| $\theta = 0.50$ | 0.95 | 0.90 | 0.72 |
| $\theta = 0.75$ | 0.89 | 0.95 | 0.59 |
| $\theta = 1.00$ | 0.81 | 1.02 | 0.50 | with

TABLE 2

|  | % RT | % WER | Size |
|---|---|---|---|
| General | 1.00 | 1.00 | 1.00 |
| Dialect | 0.97 | 0.88 | 1.00 |
| $\theta = 0.25$ | 0.96 | 0.87 | 0.81 |
| $\theta = 0.50$ | 0.95 | 0.90 | 0.72 |
| $\theta = 0.75$ | 0.89 | 0.95 | 0.59 |
| $\theta = 1.00$ | 0.81 | 1.02 | 0.50 |

Signed and Sealed this

Nineteenth Day of October, 2004

JON W. DUDAS
*Director of the United States Patent and Trademark Office*